US008862543B2

(12) United States Patent
Pasumarthi et al.

(10) Patent No.: US 8,862,543 B2
(45) Date of Patent: Oct. 14, 2014

(54) SYNCHRONIZING PRIMARY AND SECONDARY REPOSITORIES

(75) Inventors: Suresh Pasumarthi, Bangalore (IN); Arindam Bhattacharjee, Bangalore (IN); Shiva Prasad Nayak, Bangalore (IN); Ganesh Vaitheeswaran, Bangalore (IN)

(73) Assignee: Business Objects Software Limited, Dublin (IE)

( * ) Notice: Subject to any disclaimer, the term of this patent is extended or adjusted under 35 U.S.C. 154(b) by 0 days.

(21) Appl. No.: 13/158,539

(22) Filed: Jun. 13, 2011

(65) Prior Publication Data

US 2012/0317075 A1  Dec. 13, 2012

(51) Int. Cl.
 *G06F 17/30* (2006.01)
(52) U.S. Cl.
 CPC ............................... *G06F 17/30283* (2013.01)
 USPC ........... 707/626; 707/618; 707/620; 707/624; 707/634; 707/637
(58) Field of Classification Search
 CPC ................................ G06F 17/00; G06F 17/30
 See application file for complete search history.

(56) References Cited

U.S. PATENT DOCUMENTS

| | | | | |
|---|---|---|---|---|
| 5,475,834 | A * | 12/1995 | Anglin et al. ................. | 707/695 |
| 5,754,841 | A * | 5/1998 | Carino, Jr. ...................... | 1/1 |
| 5,794,250 | A * | 8/1998 | Carino et al. .................. | 1/1 |
| 5,864,843 | A * | 1/1999 | Carino et al. .................. | 1/1 |
| 5,963,952 | A * | 10/1999 | Smith ............................. | 1/1 |
| 6,236,767 | B1 * | 5/2001 | Altman ..................... | 382/305 |
| 6,253,193 | B1 * | 6/2001 | Ginter et al. .................. | 705/57 |
| 6,351,755 | B1 * | 2/2002 | Najork et al. ................. | 715/206 |
| 6,363,488 | B1 * | 3/2002 | Ginter et al. ..................... | 726/1 |
| 6,389,402 | B1 * | 5/2002 | Ginter et al. .................... | 705/51 |
| 6,427,140 | B1 * | 7/2002 | Ginter et al. .................... | 705/80 |
| 7,322,024 | B2 * | 1/2008 | Carlson et al. .............. | 717/120 |
| 7,343,386 | B2 * | 3/2008 | Gomes et al. ............... | 717/100 |
| 7,542,969 | B1 * | 6/2009 | Rappaport et al. .................... | 1/1 |
| 7,630,965 | B1 * | 12/2009 | Erickson et al. ...................... | 1/1 |
| 7,647,344 | B2 * | 1/2010 | Skurtovich et al. .... | 707/999.107 |
| 7,685,140 | B2 * | 3/2010 | Jackson ..................... | 707/999.1 |
| 7,730,123 | B1 * | 6/2010 | Erickson et al. ............. | 709/203 |
| 7,739,228 | B1 * | 6/2010 | Erickson et al. ............. | 707/602 |
| 7,904,480 | B2 * | 3/2011 | Palanisamy ................... | 707/798 |

(Continued)

OTHER PUBLICATIONS

Linstead, Erik, et al., "Sourcerer: mining and searching internet-scale software repositories," Springer 2009, Data Mining Knowledge Discovery, pp. 300-336 (37 total pages).*

(Continued)

*Primary Examiner* — Farhan Syed

(57) ABSTRACT

Various embodiments of systems and methods for synchronizing a primary repository and a secondary repository in a business infrastructure are disclosed. Content of artifacts present in the primary repository and the secondary repository are indexed. Based upon a search criteria received on the secondary repository, an integrated search service provided on the secondary repository is invoked to perform a combinatorial query on the indexed content and retrieve an identifier of each artifact corresponding to the search criteria. Based upon relevancy parameters, the retrieved identifiers are ranked and rendered as a categorized table including a first column and a second column for identifiers present in the primary repository and the second repository respectively. Based upon a user action received on the ranked identifiers in the first column of the categorized table, the associated artifacts are determined and downloaded from the primary repository to the secondary repository.

22 Claims, 7 Drawing Sheets

(56) References Cited

U.S. PATENT DOCUMENTS

| | | | |
|---|---|---|---|
| 7,958,103 B1* | 6/2011 | Tang et al. | 707/706 |
| 8,001,153 B2* | 8/2011 | Skurtovich et al. | 707/791 |
| 8,006,240 B2* | 8/2011 | Bhatkhande et al. | 717/169 |
| 8,024,397 B1* | 9/2011 | Erickson et al. | 709/203 |
| 8,037,453 B1* | 10/2011 | Zawadzki | 717/123 |
| 8,145,673 B2* | 3/2012 | Bloesch et al. | 707/796 |
| 8,225,283 B2* | 7/2012 | Singh et al. | 717/121 |
| 8,275,803 B2* | 9/2012 | Brown et al. | 707/802 |
| 8,315,849 B1* | 11/2012 | Gattani et al. | 704/2 |
| 8,321,201 B1* | 11/2012 | Baker et al. | 704/9 |
| 8,560,532 B2* | 10/2013 | Lamba et al. | 707/723 |
| 8,601,023 B2* | 12/2013 | Brave et al. | 707/776 |
| 8,626,491 B2* | 1/2014 | Gattani et al. | 704/9 |
| 8,661,012 B1* | 2/2014 | Baker et al. | 707/706 |
| 8,682,901 B1* | 3/2014 | Cao et al. | 707/741 |
| 8,738,617 B2* | 5/2014 | Brown et al. | 707/731 |
| 2003/0046282 A1* | 3/2003 | Carlson et al. | 707/6 |
| 2003/0126120 A1* | 7/2003 | Faybishenko et al. | 707/3 |
| 2003/0158839 A1* | 8/2003 | Faybishenko et al. | 707/3 |
| 2005/0138552 A1* | 6/2005 | Venolia | 715/526 |
| 2005/0203924 A1* | 9/2005 | Rosenberg | 707/100 |
| 2006/0004595 A1* | 1/2006 | Rowland et al. | 705/1 |
| 2006/0174190 A1* | 8/2006 | Gomes et al. | 715/511 |
| 2006/0200556 A1* | 9/2006 | Brave et al. | 709/224 |
| 2007/0150464 A1* | 6/2007 | Brave et al. | 707/5 |
| 2007/0150466 A1* | 6/2007 | Brave et al. | 707/5 |
| 2007/0150470 A1* | 6/2007 | Brave et al. | 707/6 |
| 2007/0150515 A1* | 6/2007 | Brave et al. | 707/104.1 |
| 2007/0169103 A1* | 7/2007 | Bhatkhande et al. | 717/170 |
| 2007/0191979 A1* | 8/2007 | Zeng et al. | 700/97 |
| 2008/0040314 A1* | 2/2008 | Brave et al. | 707/2 |
| 2008/0046472 A1* | 2/2008 | Gomes et al. | 707/104.1 |
| 2008/0104004 A1* | 5/2008 | Brave et al. | 706/45 |
| 2008/0181516 A1* | 7/2008 | Jackson | 382/236 |
| 2008/0201355 A1* | 8/2008 | Bloesch et al. | 707/102 |
| 2008/0288498 A1* | 11/2008 | Hinshaw et al. | 707/8 |
| 2009/0083268 A1* | 3/2009 | Coqueret et al. | 707/6 |
| 2009/0083711 A1* | 3/2009 | Singh et al. | 717/121 |
| 2009/0287678 A1* | 11/2009 | Brown et al. | 707/5 |
| 2009/0313609 A1* | 12/2009 | Ackerman et al. | 717/127 |
| 2010/0005122 A1* | 1/2010 | Jackson | 707/104.1 |
| 2010/0162225 A1* | 6/2010 | Huang et al. | 717/171 |
| 2010/0211593 A1* | 8/2010 | Skurtovich et al. | 707/769 |
| 2011/0219034 A1* | 9/2011 | Dekker et al. | 707/780 |
| 2012/0078888 A1* | 3/2012 | Brown et al. | 707/723 |
| 2012/0078889 A1* | 3/2012 | Chu-Carroll et al. | 707/723 |
| 2012/0078891 A1* | 3/2012 | Brown et al. | 707/723 |
| 2012/0084293 A1* | 4/2012 | Brown et al. | 707/741 |
| 2012/0124547 A1* | 5/2012 | Halbedel | 717/100 |
| 2012/0143867 A1* | 6/2012 | Roy et al. | 707/737 |
| 2012/0158657 A1* | 6/2012 | Bernstein et al. | 707/634 |
| 2012/0166443 A1* | 6/2012 | Bloesch et al. | 707/740 |
| 2012/0297278 A1* | 11/2012 | Gattani et al. | 715/205 |
| 2013/0006641 A1* | 1/2013 | Brown et al. | 704/270.1 |
| 2013/0007033 A1* | 1/2013 | Brown et al. | 707/764 |
| 2013/0007055 A1* | 1/2013 | Brown et al. | 707/769 |
| 2013/0013615 A1* | 1/2013 | Brown et al. | 707/741 |
| 2013/0018876 A1* | 1/2013 | Chu-Carroll et al. | 707/723 |
| 2013/0103389 A1* | 4/2013 | Gattani et al. | 704/9 |

OTHER PUBLICATIONS

Chien, Shu-Yao, et al., "Storing and Querying Multiversion XML Documents using Durable Node Number," IEEE, 2002, pp. 232-242 (11 total pages).*

Bell, Charles, "Attribute-Level Versioning: A Relational Mechanism for Version Storage and Retrieval," Doctoral Thesis, Department of Engineering, Virginia Commonwealth University, 2005, pp. 1-386.*

* cited by examiner

SYNCHRONIZING PRIMARY AND SECONDARY REPOSITORIES

FIELD

The field generally relates to computer systems, and more particularly to methods and systems to synchronize a primary repository and a secondary repository of data.

BACKGROUND

In current business environment, enterprise data centers contain a large centralized database containing business data. Users who operate on the business data, either for viewing or for updates, have their own user-specific databases through which they access the centralized databases. Users have to fetch data from the centralized business databases and load it on to their user-specific databases to use the business data for executing business processes. This practice could get cumbersome, since the centralized databases typically contain enormous amount of business data. Manual synchronization between the centralized databases and the user-specific databases may not be advisable in such cases since the user will have to go through each business document that contains the business data and identify the business data that is required for executing business processes.

SUMMARY

Various embodiments of systems and methods for synchronizing a primary repository and a secondary repository in a business infrastructure are disclosed. In an embodiment, synchronizing the primary repository and the secondary repository includes making contents of the primary repository available to the secondary repository. The primary repository and the secondary repository store business artifacts that may have been produced during a development of a business service or a business product. To execute the synchronization, contents of the business artifacts present in the primary repository and the secondary repository are indexed. A user may enter a search criteria on the secondary repository, based upon which, the contents of the primary repository is made available to the secondary repository, and thus the primary repository and the secondary repository are synchronized.

According to an embodiment, based upon the search criteria received on the secondary repository, an integrated search service that is provided on the secondary repository is invoked to perform a combinatorial query on the indexed contents of the primary repository and the secondary repository. As a result of the combinatorial query, an identifier of each artifact corresponding to the search criteria is retrieved from the indexed contents. Based upon relevancy parameters, the retrieved identifiers are ranked and rendered as a categorized table on the secondary repository. The categorized table includes the identifiers of the artifacts present in the primary repository in a first column and the identifiers of the artifacts present in the secondary repository in a second column.

In a further embodiment, the user may choose to retrieve the artifacts corresponding to one or more of the identifiers retrieved on the first column, associated with the artifacts present in the primary repository. Based upon a user action received on the ranked identifiers in the first column of the categorized table, the artifacts present in the primary repository are determined. The determined artifacts are downloaded from the primary repository to the secondary repository. Thus, the primary repository and the secondary repository are synchronized.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for systems and methods to synchronize a primary repository and a secondary repository are disclosed herein. An enterprise data management system includes a collection of functions that allows an enterprise or an organization to create and manage enterprise definition data. The enterprise data management system includes a collection of business repositories storing business information resulting from a development of a business service or a business process associated with the enterprise. In an embodiment, the business repositories may store business artifacts resulting from a development of a business service or a business product. Business users who operate on these business artifacts may have their user-specific repositories. To execute business development, users retrieve the business information from the business repositories to their user-specific repositories, depending upon the business development that needs to be executed. Contents of the business artifacts present in the business repository and the user-specific repository are indexed. A user may enter a search criteria on the user-specific repository, based upon which, the contents of the business repository is made available to the user-specific repository, and the business repositories are synchronized with user-specific repository of the user.

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
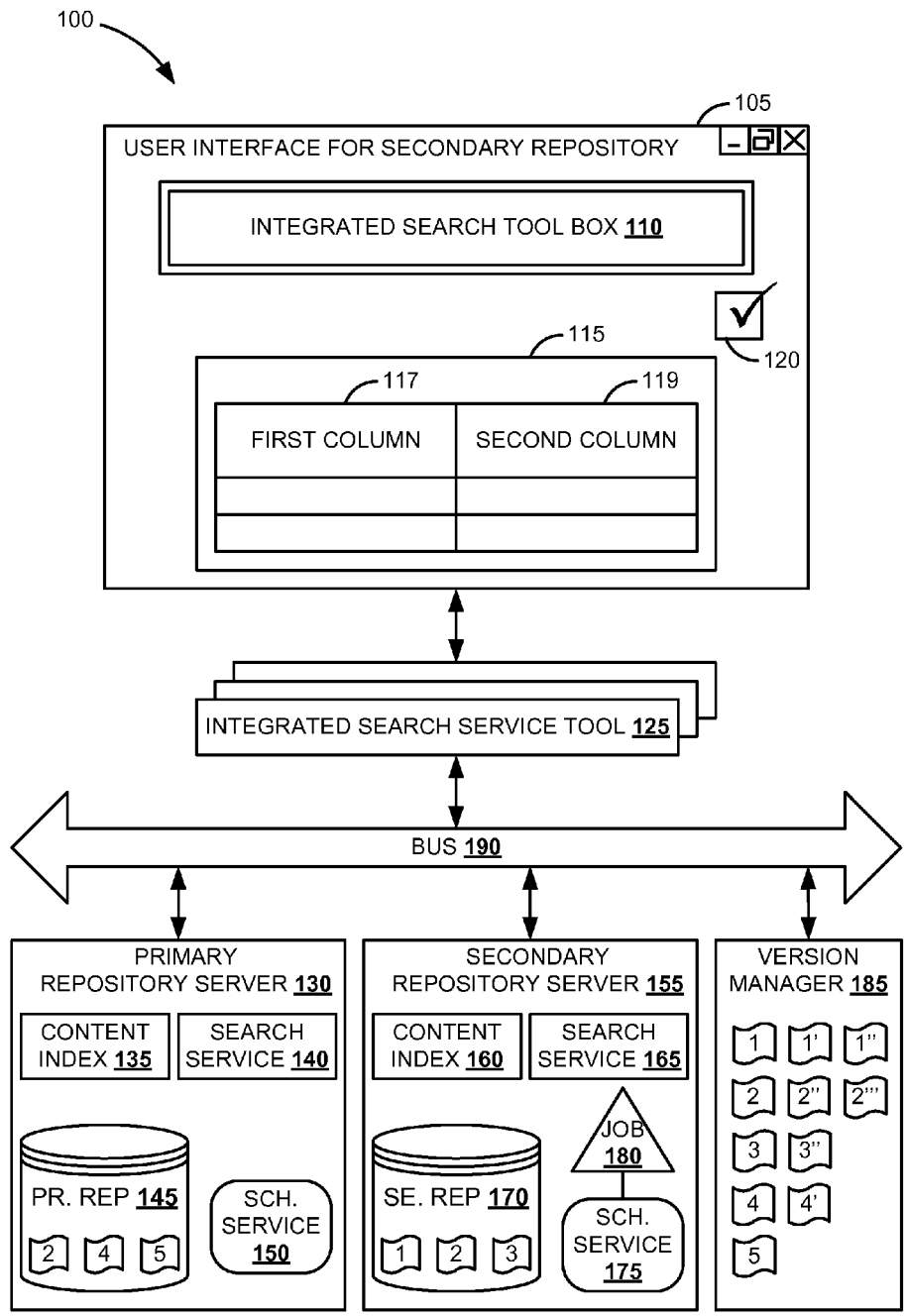
FIG. 1 is a block diagram illustrating an overview of a system for synchronizing a primary repository and a secondary repository in a business infrastructure, according to an embodiment.

FIG. 1 is a block diagram illustrating an overview of a system for synchronizing a primary repository and a secondary repository in a business infrastructure, according to an embodiment. Block 100 includes user interface for secondary repository 105, integrated search tool box 110, integrated search service tool 125, primary repository server 130, secondary repository server 155 and version manager 185. Primary repository server 130 includes content index 135, search service 140, primary repository 145, and schedule service 150. Secondary repository server 155 includes content index 160, search service 165, secondary repository 170, schedule service 175 and job 180. In an embodiment, primary repository 145 includes many artifacts (e.g. artifact 2, artifact 4, and artifact 5) and secondary repository 170 includes many artifacts (e.g. artifact 1, artifact 2, and artifact 3). Version manager 185 includes many artifacts and many versions of each artifact (e.g. artifact 1, artifact 1', artifact 1", artifact 2, artifact 2" and artifact 2'"). Version manager 185 includes variations of the artifacts present in primary repository 145 and secondary repository 170. Bus 190 establishes a connection between integrated search service tool 125, primary repository server 130, secondary repository server 155, and version manager 185. In an embodiment, bus 190 establishes a connection between one or more primary repositories and secondary repositories associated with the business infrastructure.

To execute synchronization between a business repository (e.g. primary repository 145) and a user-specific repository (e.g. secondary repository 170), contents of the artifacts present in the primary repository server 130, the secondary repository server 155 and version manager 185 are indexed. Indexing the contents of the business artifacts includes collecting business information from the business artifacts and compiling the collected information into a file or a catalogue to facilitate efficient searching of contents of the business artifacts. The file or the catalogue may be an embodiment of a data structure having columns and rows to store the collected information in a manner that supports retrieval of the contents.

To index the contents of primary repository 145 and secondary repository 170, search service (e.g. 140 and 165) is rendered to continually crawl primary repository 145 and secondary repository 170, and extract searchable contents of the business artifacts present in the repositories. In an embodiment, version manager 185 may include a search service to continuously crawl the version manager 185 and extract searchable contents of the business artifacts present in version manager 185. The searchable contents of an artifact are typically the contents of the artifact whose information may be used to identify the artifact. In an embodiment, metadata associated with each artifact includes information about the artifact, for instance the searchable contents of the artifact.

The searchable contents of the artifacts may include information about one or more users that have viewed or modified the artifacts, or the users that have the administrative rights to modify or add artifacts, user groups that include such users, the authorizations or administrative rights of such user groups with reference to the repositories, administrative rights of the artifacts, administrative rights of parent artifacts based upon a hierarchy of artifacts, and the like. The contents include information about dependencies that exist between the artifacts baseline information of the artifacts that describes the original contents of the artifacts, versions information of the artifacts that describes the variation of the original contents of the artifacts, and the like. The contents of the artifact include quality rating information for all the artifacts, where the quality rating depends upon the version of the artifact. In an embodiment, a modification to one or more artifacts may include a modification done to the information of the searchable contents.

For instance, an artifact '10b' may be accessed by users 'A' and 'B' and user 'A' may have the administrative rights to modify the contents of the artifact '10b'. The artifact '10b' may be depending upon a parent artifact '1' existing in a hierarchy. The searchable contents of the artifact '10b' may be described as follows:

Users of artifact '10b'=User 'A', User 'B'
Administrative rights to artifact '10b'=User 'A'
Dependency list of artifact '10b'=Parent Artifact '1'
Baseline of the artifact '10b'=Artifact '10'
Version number of the artifact '10b'=Version 2 (e.g. artifact '10a' may be version 1, and artifact '10b' may be version 2 of the baseline artifact '10')
Quality rating of the artifact '10b'=Quality of baseline artifact '10'÷version number 2 of artifact '10b'.

The above information is extracted from each of the artifacts present in primary repository 145, secondary repository 170 and version manager 185. A data structure is created to organize and store the extracted searchable contents of the business artifacts and an indexer is enabled to index the contents of the business artifacts present in primary repository 145 and secondary repository 170. In an embodiment, the searchable contents of business artifacts present in primary repository 145 are stored in an associated content index 135 and the searchable contents of business artifacts present in secondary repository 155 are stored an associated in content index 160. In an embodiment, an index run is scheduled to timely monitor the primary and the secondary repositories (e.g. 145 and 170). Based upon any modifications (e.g. addition of new artifacts or modification of existing artifacts) in primary repository 145 or secondary repository 170, the contents of modified artifacts or new artifacts are also indexed. The content index (e.g. 135 and 160) may schedule the index run to monitor primary repository 145 and secondary repository 170. In an embodiment, an associated schedule service (e.g. 150 and 175) may schedule the index run to monitor primary repository 145 and secondary repository 170.

Based upon a search criteria received at the integrated search tool box 110 present in user interface of the secondary repository 105, integrated search service tool 125 associated with secondary repository 170 is invoked to perform a combinatorial query on content index 135 of primary repository 145, content index 160 of secondary repository 170 and version manager 185, and retrieve an identifier for each artifact and associated metadata corresponding to the search criteria. In an embodiment, version manager 185 stores one or more variations of the baseline artifacts present in primary repository 145 and secondary repository 170. For instance, version manager 185 includes baseline artifact 1, and corresponding variations version 1' and version 1". The variations of the baseline artifact may have been generated during a process of business development. The baseline artifact that undergoes any modification during the business development is stored as a variation of the baseline artifact to facilitate availability of all the variations of the artifact.

Integrated search tool box 110 that is provided on user interface for secondary repository 105 receives a search criteria from a user. In an embodiment, a search criterion may include a set of search keywords entered by the user based upon which primary repository 145 and second repository 170 are synchronized. The search criteria may include one or more conditions that have to be satisfied by an artifact to be elected as a search result. Integrated search service tool 125 associated with integrated search tool box 110 is invoked to process the search criteria received by eliminating stop-words present in the received search criteria. Stop-words may be described as common-words that do not carry substantial meaning to be considered for performing a search. For instance, in a search criterion "sales report of the country USA", the common-words "of" and "the" are considered as stop-words. Such stop-words may be eliminated from the search criteria. Theme-words present in the received search criteria are determined by integrated search service tool 125. Theme-words may be described as a group of words about a common topic and facilitate in finding a set of related words that may be associated with the search criteria. For instance, in a search criterion "sales report for USA", the theme-word 'USA' may have a group of words associated with it, like 'America", 'United States' etc.

Integrated search service tool 125 creates an index search query to perform the combinatorial query on the indexed contents of primary repository 145, secondary repository 170, and version manager 185. A combinatorial query may be described as a query performed simultaneously on multiple repositories, to retrieve multiple results that satisfy a co-occurrence of conditions in the search criteria. For instance, a search criteria "sales report of the country USA for year 2012", may be queried on primary repository 145, secondary repository 170 and version manager 185 simultaneously, to retrieve one or more artifacts and associated metadata from all the three databases (145, 170 and 185). A combinatorial query is performed on content index 135 of primary repository 145, content index 160 of secondary repository 170 and version manager 185 simultaneously, to retrieve artifact 1, artifact 4, artifact 2"' that satisfies a co-occurrence of the conditions "sales report of the country USA" and "for year 2012". In an embodiment, a recurring combinatorial query may be performed based upon a group of search criteria that may be received at a same instance, or at difference instances. For example, a group of search criteria may include three search criteria that are entered subsequently, and based upon the group of three search criteria, the recurring combinatorial query is performed. In another embodiment, the query may also result in retrieving artifacts that partially satisfy the search condition. A weight for each artifact may be determined based upon the number of search conditions it satisfies.

Based upon the combinatorial query performed on content index 135 of primary repository 145, content index 160 of secondary repository 170 and version manager 185, a set of identifiers associated with the artifacts and associated metadata corresponding to the search criteria are retrieved. An identifier of the artifact establishes an identity of the artifact. Based upon relevancy parameters, the retrieved identifiers are ranked and rendered as categorized table 115 on user interface for secondary repository 105. Categorized table 115 includes first column 117 to render the ranked identifiers associated with the artifacts present in primary repository and second column 119 to render the ranked identifiers associated with the artifacts present in second repository 170. In an embodiment, the identifiers retrieved from version manager 185 are also rendered on first column 117.

In another embodiment, the search criteria may be received on primary repository 145 or secondary repository 170, to query one or more primary repositories or one or more secondary repositories, or a combination of primary and secondary repositories. The identifiers of artifacts present in a repository that receives the search criteria—are rendered on a second column. The identifiers of artifacts present in one or more repositories that are being queried—are rendered on a first column. Rendering the identifier of the artifacts corresponding to the search criteria includes creating a row for each of the retrieved identifiers of the artifact. Each row represents one artifact corresponding to the search criteria and is identified by the identifier associated with that artifact. Each row may include one or more fields, and the fields are populated using the associated metadata of the artifact of each retrieved identifier. The fields may include a name field describing the name of the associated artifact, a location field describing the location of the artifact, and the like.

In an embodiment, version manager 185 is associated with primary repository 145 and secondary repository 170. The content of artifacts and variations of the artifacts stored in version manager 185 are also indexed simultaneous to primary repository 145. The combinatorial query is performed simultaneously on primary repository 145, secondary repository 170 and version manager 185. The identifiers retrieved from version manager 185 are rendered on first column 117 along with the identifiers retrieved from primary repository 145.

Ranking of identifiers present in the second column 119 includes querying the secondary repository 170, retrieving identifiers associated with the artifacts that correspond to the search criteria and sorting the retrieved list of identifiers based upon a hit-score of each of the artifacts associated with the identifiers. In an embodiment, retrieving and ranking the identifiers present on second column 119 includes identifying the artifacts available in the repository that receives the search criteria and returning a list of one or more artifacts corresponding to the search criteria, present in the repository that receives the search criteria.

Ranking of identifiers present in the first column 117 includes positioning the identifiers of the artifacts based upon a relation between the identifiers. The relevancy parameters are used to determine the relation between the identifiers for ranking. In an embodiment, the relevancy parameters includes a hit-score of each artifact, a latest version number, a maximum possible quality rating, a weight for a version number, a weight for version label, a weight for a proximity based upon a security principle, a weight for quality rating, a weight for hit-score, artifact containers containing the retrieved artifacts, and the like.

The hit score of each artifact describes a number of times the artifact has appeared as a result of querying a repository based upon the search criteria. The latest version number of an artifact describes a recent variation of the artifact. In an embodiment, second column 119 may include a version of an artifact present in secondary repository 170, and first column 117 may include an earlier version of the artifact present in secondary repository 170. The latest version number of the artifact helps in determining the recent variation of the baseline artifact that may have occurred during a business development.

In an embodiment, the identifiers of the artifacts present in the primary repository 145 and the version manager 185 are retrieved by determining a version number for each identifier of the artifact associated with the search criteria, present in the primary repository 145 and the version manager 185, and by determining a version number for each identifier of the artifact associated with the search criteria, present in the secondary repository 170. For each artifact of the primary repository 145 or the version manager 185 that has a version number greater than a version number of a corresponding artifact of the secondary repository 170, the identifiers of the artifacts are retrieved from the primary repository 145 or the version manager 185.

In an embodiment, a determination is made whether the artifact associated with the retrieved identifiers that are rendered on the first column 117 are of a version lesser than a version of the artifacts associated with the identifiers rendered on the second column 119. If the version of the artifact associated with the identifier rendered on the second column 119 is greater, then, the artifact present in the secondary repository 170 is a newer version compared to the artifact present in the primary repository 145. Hence, such an older version of the artifact may not be intended for retrieval on the first column 117.

The quality rating of an artifact is described as a characteristic property that defines a nature of the artifact with reference to a variation of the contents of the artifact. For instance, a baseline version of the artifact describes the original contents of the artifact, as configured at the time of creation of the artifact and hence, such a baseline version is of a highest quality rating. A first variation of the artifact may have a quality rating lower than the highest quality rating and a second variation of the artifact may have a quality rating lower than the quality rating of the first variation, and so on. Thus, the maximum possible quality rating of an artifact may be described as a quality rating of the least varied version of the artifact available.

A weight of a parameter may be described as a numeric value that defines a relative proximity or a relative importance of various parameters. For instance, between the parameters version number, version label and quality rating, a highest weight may be assigned to quality rating, thereby defining the parameter quality rating as the most important parameter among the parameters version number, version label and quality rating. A numeric value may be assigned for each of the parameters depending upon the importance of that parameter during ranking of the identifiers of the artifacts. Such a numeric value may be assigned as a weight for the version number of each artifact, a weight for the version label of each artifact, a weight for proximity of each artifact, a weight for the quality rating of each artifact and a weight for the hit-score of each artifact.

The proximity of an artifact is determined based upon the administrative rights, and may be described as a distance between the artifact in consideration and a user who is accessing the artifact. The proximity is a numeric value that is calculated based upon a user's access to each artifact associated with the identifiers retrieved from primary repository. Artifact containers may be described as database containers that store primary repositories and secondary repositories. For example, FIG. 2 is a block diagram illustrating an exemplary method involved during the synchronization of a primary repository and a secondary repository in a business infrastructure, according to an embodiment.

Figure 2:
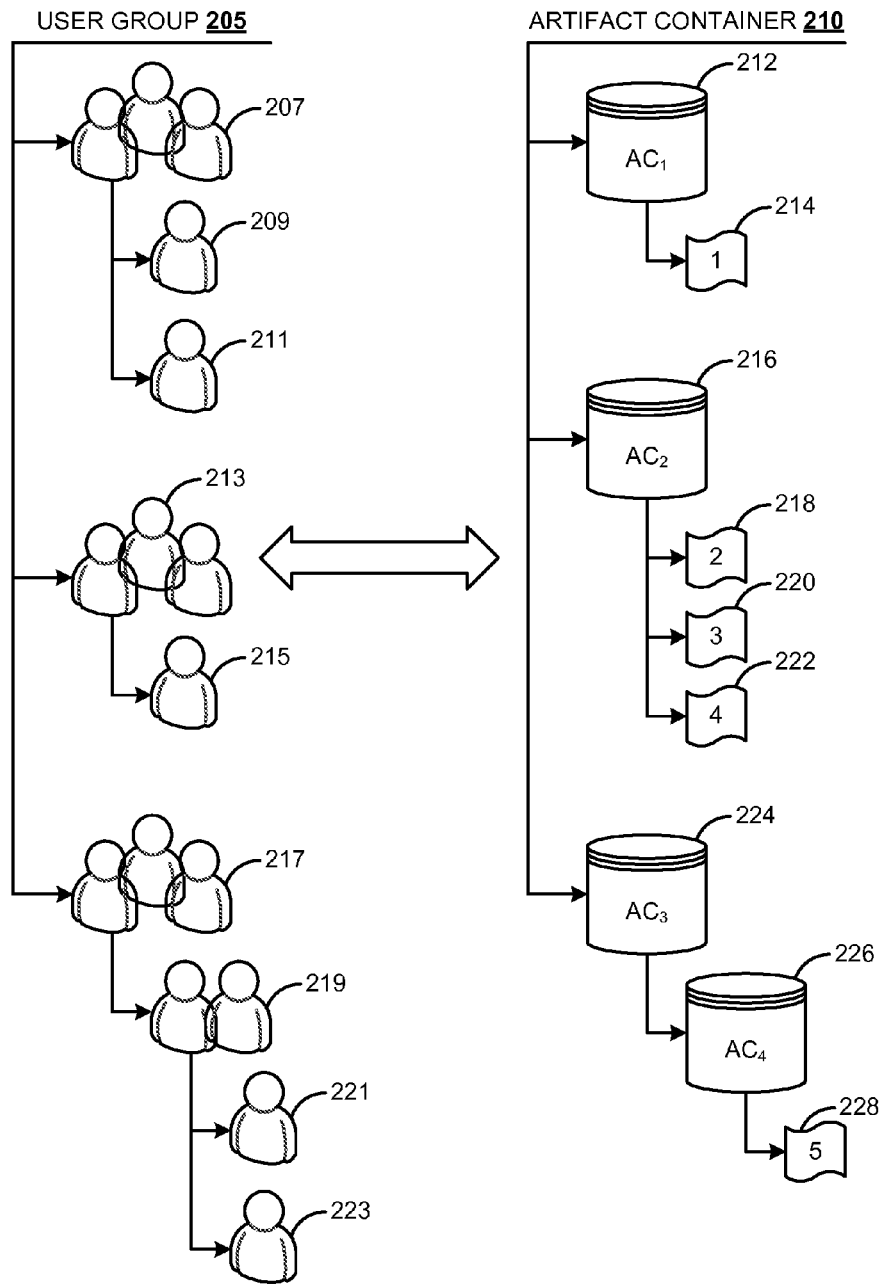
FIG. 2 is a block diagram illustrating an exemplary method involved during the synchronization a primary repository and a secondary repository in a business infrastructure, according to an embodiment.

FIG. 2 illustrates a layout of one or more artifacts stored in artifact container 210 and one or more users existing in user group 205. According to FIG. 2, user group 205 includes user groups 207, 213 and 217. User group 207 includes user 209 and user 211. User group 213 includes user 215 and user group 217 includes user group 219, which in turn includes user 221 and user 223. Artifact container 210 includes artifact container 212, artifact container 216 and artifact container 224. Artifact container 212 includes artifact 214. Artifact container 216 includes artifact 218, artifact 220 and artifact 222. Artifact container 224 includes artifact container 226, which in turn includes artifact 228. A user group may be described as a group of one or more users, and hence may also be referred to as a user. In an embodiment, an artifact container may be described as a database that stores artifacts and associated metadata of all the repositories in a business infrastructure.

Based upon the administrative rights, to compute proximity between user 221 and artifact 228, the distance between user 221 and artifact 228 is determined. The distance between user group 205 and artifact container 210 is one, since user group 205 has to perform one jump (between 205 and 210) to access artifact container 210. Hence, the proximity between artifact container 210 and user group 205 is the highest, according to FIG. 2.

The distance between user group 207 and artifact container 212 is three, since user group 207 has to perform three jumps (between 207 and 205; between 205 and 210; and between 210 and 212) to access artifact container 212. Hence, the proximity between artifact container 212 and user group 207 is lower compared to the above example (between 210 and 205).

Similarly, the distance between user 221 and artifact 228 is seven, since user 221 has to perform seven jumps (between 221 and 219; between 219 and 217; between 217 and 205; between 205 and 210, between 210 and 224; between 224 and 226; between 226 and 228) to access artifact 228. Hence, the proximity between artifact 228 and user 221 is least compared to the above two examples (between 210 and 205; and between 207 and 212).

Based upon the administrative rights of a user to an artifact, a weight for the proximity for a user with a direct access to the artifact is computed as a maximum weight for proximity. For instance, user group 205 has administrative rights to artifact container 210, and user group 205 has direct access to artifact container 210. Hence the numeric value assigned to the weight for the proximity of user group 205 with direct access to artifact container 210 is the maximum weight for proximity. The weight for proximity 'W' for user 'U' with a direct access may be computed as:

$$WU = WU_{max}$$

Based upon the administrative rights of a user to an artifact, a weight for the proximity for a user with an indirect access to the artifact is computed as an intermediate weight for proximity. For instance, if user group 207 had direct access to artifact container 212, and if user 209 wanted to access artifact container 212, since user 209 belongs to user group 207 that has direct access to artifact container 212, the access of user 209 is indirect. In an embodiment, the weight for proximity for a user with an access to the artifact existing in a hierarchy is computed as a product of the maximum weight of the proximity and a numeric value assigned to the access based upon a number of levels in the hierarchy. For instance, if user group 207 wanted to access artifact 228 that exists in a hierarchy, the access of user 207 is indirect and hierarchical.

The weight for the proximity "W" for a user "U" with an indirect access may be computed as:

$$WU = \frac{K}{N} \times WU_{max}$$

where K denotes a proximity constant for an indirect access and N denotes the number of levels in the hierarchy. The proximity constant 'K' may have any value between 0.1 and 1 ($0.1 \leq K \leq 1$), where the value 0.1 denotes a minimum proximity or a maximum distance (or the maximum allowable jumps) and the value 1 denotes a maximum proximity or a minimum distance (or the minimum allowable jumps, which is one jump). Similarly, the number of levels may have any value between 1 and 'n' where 'n' is the maximum allowable levels, and the value 1 denotes a direct access of at least 1 jump ($1 \leq N \leq n$).

Applying this computation for the above example of user group 207 accessing artifact 228, having a maximum allowable jumps of ten, and an actual number of jumps of five, the weight for proximity for user group 207 is:

$$WU_{207} = \frac{0.5}{3} \times WU_{max}$$

Based upon the above relevancy parameters scores are computed to rank the retrieved identifiers. A first computed score associated with the relevancy parameters is calculated by computing a product of a hit-score and a weight for the hit-score for each artifact associated with the identifier retrieved from the primary repository and/or the version manager. The first computed score $SC_1$ for each artifact associated with the identifier retrieved may be defined as:

$$SC_1 = S \times WS$$

where 'S' is the hit score and WS is the weight for the hit-score for each artifact.

A second computed score associated with the relevancy parameters is calculated by computing a ratio of the version number and the latest version number of each artifact associated with the identifier retrieved from the primary repository, a product of the ratio and the weight for the version number and a sum of the product and the first computed score. The second computed score $SC_2$ for each artifact associated with the identifier retrieved may be defined as:

$$SC_2 = SC_1 + \frac{V}{V_l} \times WV$$

where '$SC_1$' is the first computed score, 'V' is the version number, '$V_l$' is the latest version number, and 'WV' is the weight for the version number for each artifact.

A third computed score associated with the relevancy parameters is calculated by determining if each artifact associated with the identifier retrieved from the primary repository is labeled and if the artifacts are labeled, a sum of the weight for the labeled artifact and the second computed score is determined. The third computed score $SC_3$ for each artifact associated with the identifier retrieved may be defined as:

$$SC_3 = SC_2 + WL$$

where '$SC_2$' is the second computed score, and 'WL' is the for each of the labeled artifacts.

A fourth computed score associated with the relevancy parameters is calculated by computing a ratio of the quality rating and the maximum possible quality rating for each artifact associated with the identifier retrieved from the primary repository, a product of the ratio and the weight for the quality rating for each artifact and a sum of the product and the third computed score. The fourth computed score '$SC_4$' for each artifact associated with the identifier retrieved may be defined as:

$$SC_4 = SC_3 + \frac{QR}{QR_{max}} \times WQR$$

where '$SC_3$' is the third computed score, 'QR' is the quality rating, '$QR_{max}$' is the maximum possible quality rating, and 'WQR' is the weight for the quality rating for each artifact.

A fifth computed score associated with the relevancy parameters is calculated by computing a sum of the weight for proximity of a user, based upon administrative rights for each artifact associated with the identifier retrieved from the primary repository and the fourth computed score. The fifth computed score '$SC_5$' for each artifact associated with the identifier retrieved may be defined as:

$$SC_5 = SC_4 + WU_{ER}$$

where '$SC_4$' is the fourth computed score, and $WU_{ER}$ is the weight for proximity of a user based upon the administrative rights for each artifact.

Referring back to FIG. 1, in an embodiment, if one or more of the artifacts associated with the retrieved identifiers on the first column are dependent on one or more artifacts present in the primary repository or the version manager, a dependency list is generated. The dependency list contains a list of such artifacts associated with the retrieved identifiers and their corresponding dependent artifacts. A determination is made whether the dependent artifacts are associated with the search criteria. Based upon the determination and the dependency list, a total number of dependencies is computed for each artifact associated with the identifiers present in the first column. For each dependent artifact, administrative rights for the user who provided the search criteria are determined. If the user has administrative rights to each of the dependent artifacts, then a computed score for such dependent artifacts are equated to the fifth computed score associated with the relevancy parameters for the artifact associated with the retrieved identifiers. Further, if the dependent artifacts are already present in the secondary repository, the identifiers associated with such dependent artifacts are not retrieved. If the dependent artifacts are not present in the secondary repository, the identifiers associated with such dependent artifacts are retrieved from the primary repository and/or version manager and rendered on the first column.

A sixth computed score associated with the relevancy parameters is calculated for the artifacts associated with the retrieved identifiers, having dependencies. The sixth computed score '$SC_6$' for each artifact associated with the retrieved identifier, having dependencies—may be defined as:

$$SC_6 = SC_5 + Wd \times D$$

where '$SC_5$' is the fifth computed score, Wd is the weight for the dependencies and D is the total number of dependencies for each artifact associated with the retrieved identifiers.

In an embodiment, an overall computed score associated with overall relevancy parameters may include any number of parameters associated with attributes, their corresponding weights and their corresponding relevancies. The overall relevancy parameter may be defined as a relevancy of any parameters associated with corresponding attributes, and may be defined by a user, a system, or the like. Such an overall computed score associated with the overall relevancy parameters may be defined as:

$$SC_{overall} = \frac{\sum_{I=0}^{Z} \int (W_I) \times R_I}{\sum_{I=0}^{Z} W_I}$$

where $SC_{overall}$ is the overall computed score; Z is the total number of parameters defined by P, where $P=\{P_1, P_2, P_3, \ldots P_i, \ldots Z_Z\}$; R is a set of computed relevancy defined by $R=\{R_1, R_2, R_3, \ldots R_i, \ldots R_Z\}$, where '$R_1$' is the relevancy number associated with $P_1$, where $0 \leq R_1 \leq 1$; 'W' is as set of weights defined by $W=\{W_1, W_2, W_3, \ldots W_1, \ldots W_Z\}$, where $W_1$ is the weight associated with parameter $P_I$; and '$f()$'—the integral function modifies the weight $W_1$ when the dependencies are found or when Wd is found to be higher.

Thus, for $I^{th}$ parameter, the overall computed score may be defined as:

$$SC_I = \frac{\int (W_I) \times R_I}{WI}$$

For instance, if three parameters are defined to compute the overall computed score of an artifact, Z=3, and I=0, 1, 2, 3; The overall computed score of the artifact may be described as:

$$SC_{overall} = \frac{\int (W_0) \times R_0 + \int (W_1) \times R_1 + \int (W_2) \times R_2 + \int (W_3) \times R_3}{W_0 + W_1 + W_2 + W_3}$$

where W0, W1, W2 and W3 are weights of four relevancy parameters R0, R1, R2, and R3. The overall computed score is a summation of computed scores for a zeroth computed score, the first computed score, the second computed score, and the third computed score divided by the sum of their respective weights. Thus, the computed scores are computed for all the artifacts, and the corresponding identifiers are ranked in the first column of the categorized table.

Ranking the retrieved identifiers in the first column of the categorized table includes sorting the retrieved identifiers based upon the fifth computed score or the sixth computed score (for the artifacts having dependencies) associated with the relevancy parameters for each artifact associated with the identifiers retrieved from the primary repository and the version manager.

Based upon a user action received on the ranked identifiers in the first column of the categorized table, the associated artifacts are determined and downloaded from the primary repository and/or the version manager to the secondary repository. In an embodiment, the user may choose to download a first five ranked identifiers. The artifacts associated with the first five identifiers are determined and downloaded to the secondary repository.

In an embodiment, based upon the relevancy parameters, a minimum allowable score and an allowable score is computed for the identifiers in the first column of the categorized table. A minimum allowable score may be described as a fifth computed score or a sixth computed score of that artifact corresponding to the identifier having a minimum rank to qualify for retrieving the associated artifact. An allowable score may be described as a fifth computed score or a sixth computed score of the artifacts corresponding to the identifiers having a rank higher than the minimum rank to quality for retrieving the associated artifact. All the identifiers having the computed score greater than the minimum allowable score is determined and sorted according to their respective ranks, to form job object 180. A job object may be described as a job that needs to be performed by integrated search tool. In an embodiment, a user may be provided with an option to enable execution of job object 180. For instance, a user interface element 'checkbox' 120 may be checked by the user, to notify secondary repository server 155 to execute job object 180. Integrated search tool determines the administrative rights corresponding to the identifiers present in job object 180. Job object 180 is executed by schedule service, to access the primary repository and the version manager, and determine the artifacts associated with the identifiers present in job object 180. The schedule service may be utilized to run job object 180 at regular intervals. In an embodiment, the scheduled job run is executed for job object 180 by signing in to the primary repository. In an embodiment, signing in to the repository includes determining the administrative rights available for the user to access the primary repository, and accessing the artifacts. The determined artifacts corresponding to the job object are downloaded to create an archive file. In an embodiment, the archive file is uploaded to the secondary repository and deployed, to synchronize the secondary repository with the primary repository.

Figure 3:
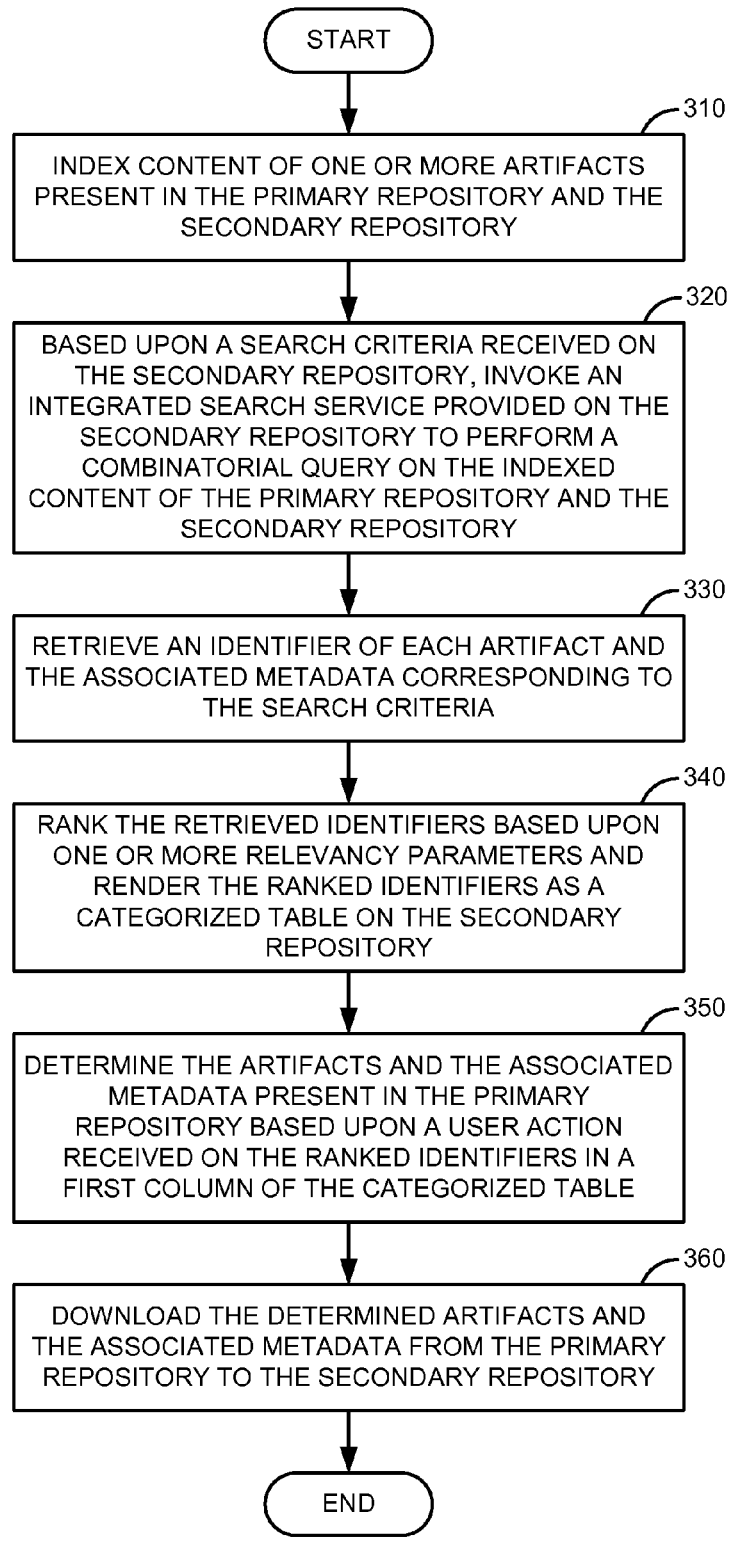
FIG. 3 is a process flow diagram illustrating a method for synchronizing a primary repository and a secondary repository in a business infrastructure, according to an embodiment.

FIG. 3 is a process flow diagram illustrating a method for synchronizing a primary repository and a secondary repository in a business infrastructure, according to an embodiment. In an embodiment, the primary repository and the secondary repository stores business artifacts that may have been produced during a development of a business service or a business product. Contents of the artifacts include business information relating to the business development. In an embodiment, a user has access to the secondary repository, and executes the process of synchronizing the primary repository and the secondary repository. In process block 310, the contents of the artifacts present in the primary repository and the secondary repository are indexed. The user may enter a search criteria on the secondary repository, based upon which the contents of the primary repository is made available to the secondary repository, and thus the primary repository and the secondary repository are synchronized. In process block 320, based upon a search criteria received on the secondary repository, an integrated search service provided on the secondary repository is invoked to perform a combinatorial query on the indexed contents of the primary repository and the secondary repository. In process block 330, the results of the combinatorial query are retrieved, wherein an identifier of each artifact and the associated metadata corresponding to the search criteria are retrieved. In process block 340, the retrieved identifiers are ranked based upon relevancy parameters and rendered as a categorized table on the secondary repository. In an embodiment, the categorized table includes a first column and a second column for identifiers present in the primary repository and the secondary repository respectively. In process block 350, based upon a user action received on the ranked identifiers in the first column of the categorized table, the artifacts and the associated metadata present in the primary repository are determined. In process block 360, the determined artifacts and the associated metadata are downloaded from the primary repository to the secondary repository.

Figure 4:
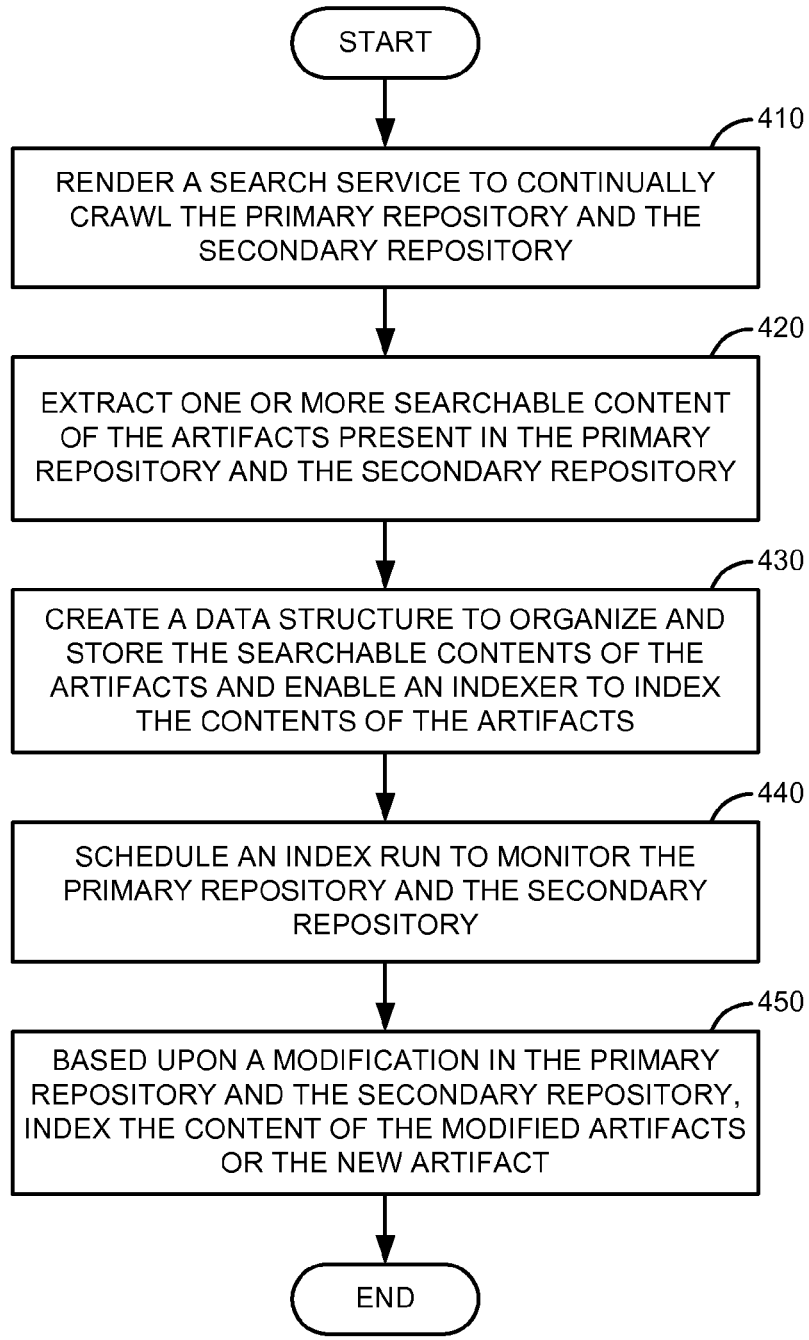
FIG. 4 is a process flow diagram illustrating a method for indexing contents of a primary repository and a secondary repository in a business infrastructure, according to an embodiment.

FIG. 4 is a process flow diagram illustrating a method for indexing contents of a primary repository and a secondary repository in a business infrastructure, according to an embodiment. In process block 410, a search service is rendered on a server associated with each repository (e.g. primary and secondary) to continually crawl the primary repository and the secondary repository. In process block 420, the server extracts the searchable content of the artifacts stored in the primary repository and the secondary repository. In process block 430, the server creates a data structure to organize and store the searchable contents of the artifacts. The server also enables an indexer to index the contents of the artifacts. In process block 440, an index run is scheduled for the indexer to monitor the primary repository and the secondary repository. During the scheduled index run, the indexer monitors any modifications in the artifacts or an addition of a new artifact. In process block 450, based upon a modification in the primary repository and the secondary repository, the indexer is invoked to index the contents of the modified artifacts or the new artifacts and update the data structure.

Figure 5:
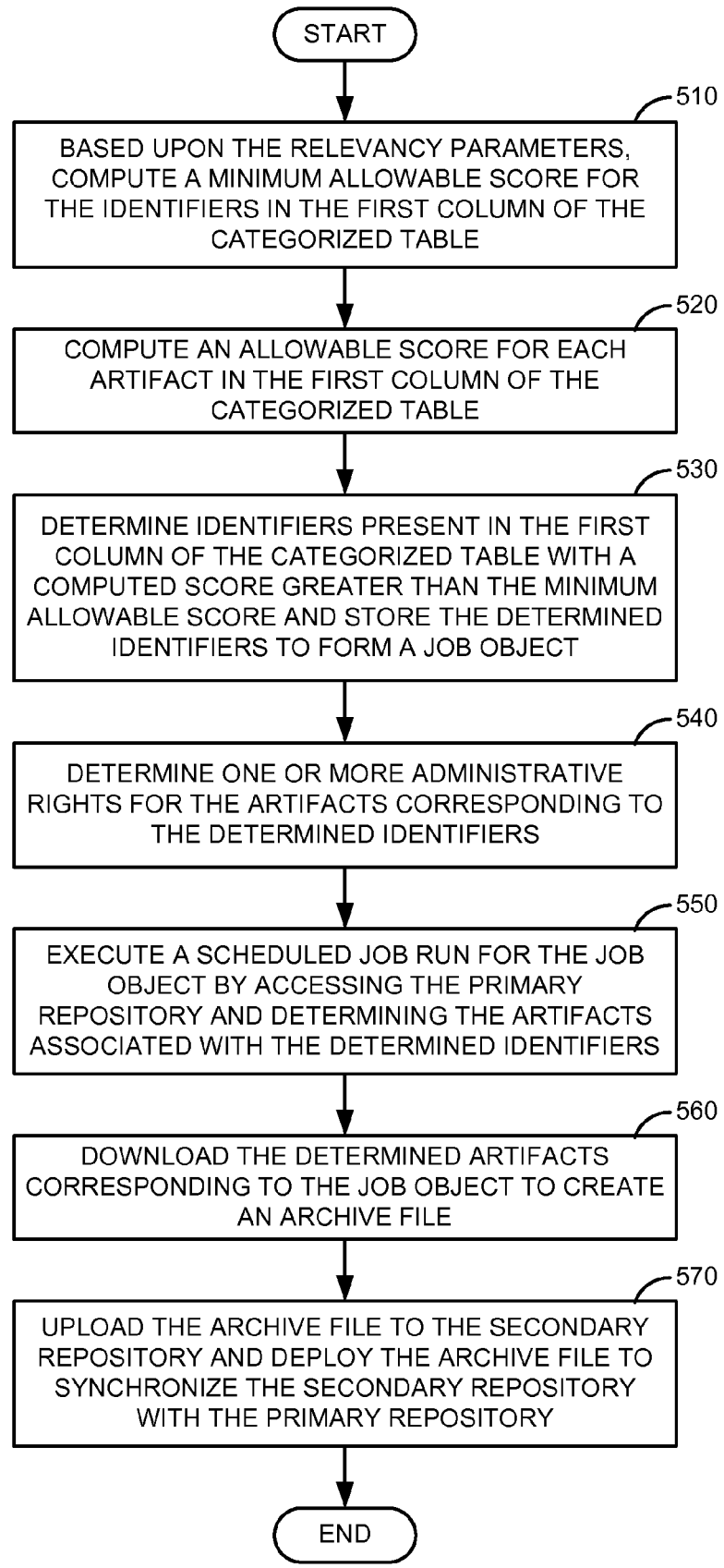
FIG. 5 is a process flow diagram illustrating a method for fetching relevant artifacts to synchronize a primary repository and a secondary repository in a business infrastructure, according to an embodiment.

FIG. 5 is a process flow diagram illustrating a method for fetching relevant artifacts to synchronize a primary repository and a secondary repository in a business infrastructure, according to an embodiment. In process block 510, based upon the relevancy parameters, a minimum allowable score is computed for the identifiers in the first column of the categorized table. In process block 520, an allowable score is computed for each artifact in the first column of the categorized table. In process block 530, identifiers present in the first column of the categorized table, with a computed score greater than the minimum allowable score, are determined and the determined identifiers are sorted to form a job object. In process block 540, administrative rights corresponding to the determined identifiers of the artifacts are determined. In process block 550, a scheduled job run is executed for the job object by accessing the repository, and the artifacts associated with the identifiers are determined. In an embodiment, the scheduled job run is executed for the job object by signing in to the repository. In process block 560, the determined artifacts corresponding to the job object are downloaded to create an archive file. In process block 570, the archive file is uploaded to the secondary repository and deployed, to synchronize the secondary repository with the primary repository.

Figure 6:
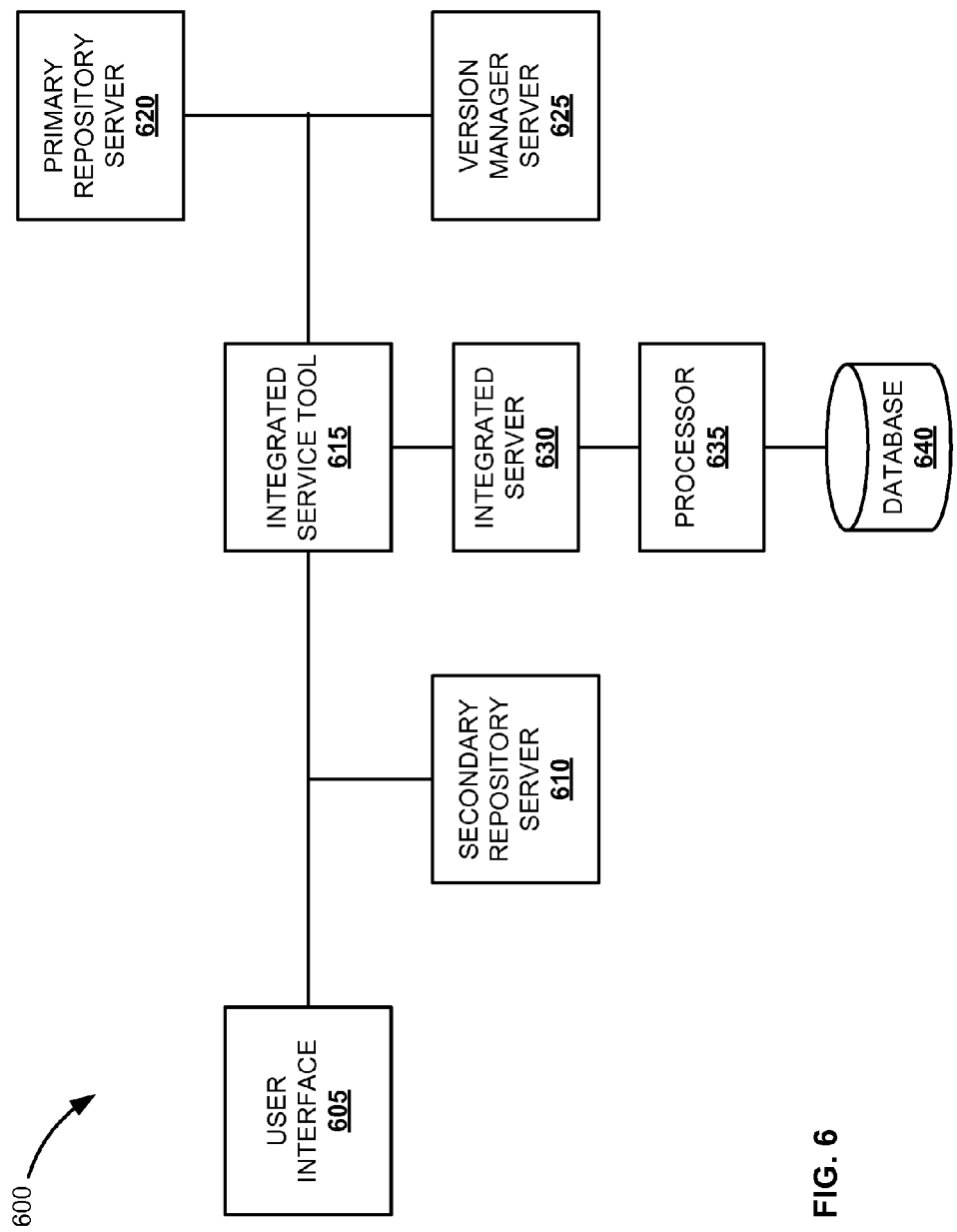
FIG. 6 is a block diagram illustrating a computer system for synchronizing a primary repository and a secondary repository in a business infrastructure, according to an embodiment.

FIG. 6 is a block diagram illustrating a computer system for synchronizing a primary repository and a secondary repository in a business infrastructure, according to an embodiment. Computer system 600 includes user interface 605, secondary repository server 610, integrated service tool 615, integrated server 630, processor 635, database 640, primary repository server 620, and version manager server 625. In an embodiment, user interface 605 is in communication with secondary repository server 610 and integrated service tool 615. Integrated service tool 615 is in communication with integrated server 630, processor 635 and database 640. Integrated service tool 615 is also in communication with primary repository server 620 and version manager server 625. Processor 635 is configured to read and execute instructions stored in memory elements (for e.g. database 640), that store instructions to execute the synchronization of the primary repository and the secondary repository.

Processor 635 associated with database 640, indexes the contents of artifacts present in the primary repository, the secondary repository and a version manager. Primary repository server 620 is responsible for accessing the artifacts stored in the primary repository and rendering searchable contents of the artifacts to processor 635 for indexing. Version manager server 625 is responsible for accessing the artifacts stored in the version manager and for rendering searchable contents of the artifacts to processor 635 for indexing. Secondary repository server 610 is responsible for accessing the artifacts stored in the primary repository and rendering searchable contents of the artifacts to processor 635 for indexing. User interface 605 associated with secondary repository server 610 is responsible for receiving search criteria from a user, based upon which the primary repository and the secondary repository are synchronized.

Based upon the search criteria received on user interface 605 associated with secondary repository server 610, integrated server 630 invokes integrated service tool 615 to perform a combinatorial query on the indexed contents of the primary repository, the secondary repository and the version manager. Upon executing the query, integrated service tool 615 retrieves an identifier of each artifact and associated metadata corresponding to the search criteria. Integrated server 630 is responsible for ranking the retrieved identifiers based upon relevancy parameters. Integrated server 630 is also responsible for rendering the ranked identifiers as a categorized table on user interface 605 associated with secondary repository server 610. The categorized table includes a first column and a second column, where the identifiers of the artifacts present in the primary repository are rendered on the first column and the identifiers of the artifacts present in the secondary repository are rendered on the second column. Integrated server 630 is responsible for computing the relevancy parameters, based upon which the identifiers are ranked.

Based upon a user action received on the ranked identifiers in the first column of the categorized table, secondary repository server 610 is invoked to determine the artifacts and the associated metadata present in the primary repository and the version manager and to download the determined artifacts and the associated metadata from the primary repository and the version manager to the secondary repository.

In an embodiment, processor 635 is responsible for rendering a search service to continually crawl the primary repository, the secondary repository and the version manager, and extract searchable contents of the artifact present in the primary repository, the secondary repository and the version manager to create a data structure. The data structure is created to organize and store the searchable contents of the artifacts. Processor 635 is also responsible to enable an indexer to index the contents of the artifacts, and further schedule an index run to monitor the primary repository, the secondary repository and the version manager. Based upon a modification in the primary repository, the secondary repository or the version manager, processor 635 indexes the contents of the modified artifacts or the new artifacts. The modification to the primary repository, the secondary repository and the version manager may include editing the existing artifacts or including new artifacts.

In an embodiment, integrated service tool 615 is configured to simultaneously query the primary repository, the secondary repository and the version manager and retrieve artifacts and associated metadata from primary repository, the secondary repository and the version manager. The version manager typically includes information of one or more versions or variations of the artifacts present in the primary repository and the secondary repository.

In an embodiment, based upon the relevancy parameters, integrated server 630 computes a minimum allowable score for the identifiers in the first column of the categorized table. The minimum allowable score determines the identifiers whose artifacts have to be downloaded from the primary repository. Integrated server 630 also computes an allowable score for each artifact in the first column of the categorized table, and determines the identifiers present in the first column of the categorized table with a computed score that is greater than the minimum allowable score. The determined identifiers are stored in a job object associated with secondary repository server 610. Integrated server 630 determines administrative rights for the artifact corresponding to the determined identifiers, and accesses the primary repository to execute a scheduled job run for the job object. Executing the scheduled job run includes determining the artifacts associated with the determined identifiers. Integrated server 630 downloads the determined artifacts corresponding to the job object to create an archive file. The archive file is uploaded to the secondary repository by secondary repository server 610, and deployed to synchronize the secondary repository with the primary repository.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 7:
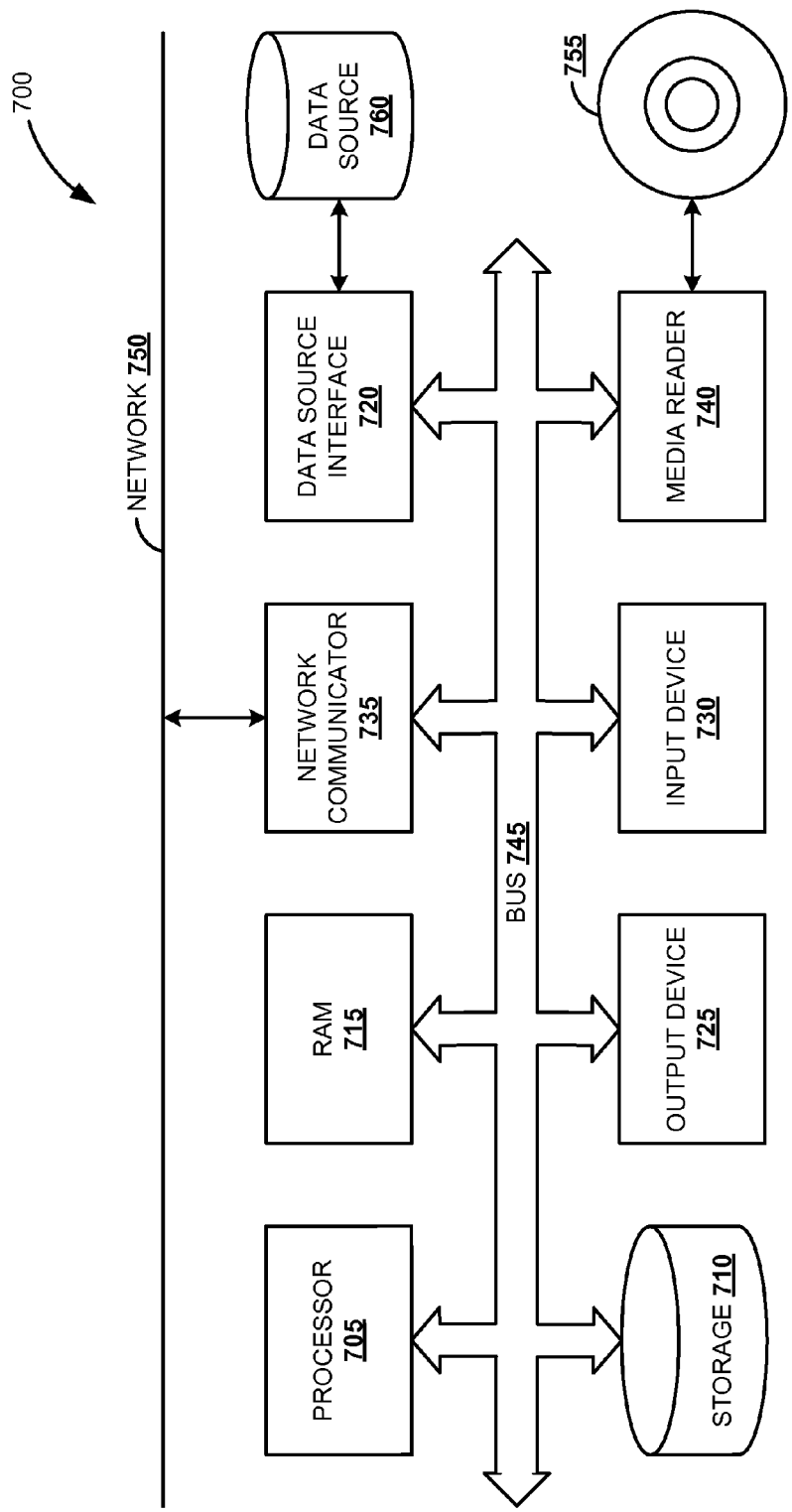
FIG. 7 is a block diagram illustrating an exemplary computer system, according to an embodiment.

FIG. 7 is a block diagram of an exemplary computer system 700. The computer system 700 includes a processor 705 that executes software instructions or code stored on a computer readable storage medium 755 to perform the above-illustrated methods of the invention. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment of the invention, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, continuation servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transaction, hierarchical, multi-dimensional (e.g., OLAP), object oriented databases, and the like. Further data sources include tabular data (e.g., spreadsheets, delimited text files), data tagged with a markup language (e.g., XML data), transaction data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer-implemented method to synchronize a primary repository and a secondary repository of data, the method comprising:
    indexing content of one or more artifacts present in the primary repository and one or more artifacts present in the secondary repository;
    based upon a search criteria received at the secondary repository, invoking an integrated search service associated with the secondary repository to:
        perform a combinatorial query, simultaneously on the indexed content of the primary repository and the indexed content of the secondary repository, and
        retrieve a plurality of identifiers of the one or more artifacts and associated metadata satisfying a co-occurrence of a plurality of conditions in the search criteria by:
            determining a version number parameter for each identifier of the artifact present in the primary repository;
            determining a version number parameter for each identifier of the artifact present in the secondary repository;
            for each artifact of the primary repository including a version number greater than a version number of a corresponding artifact of the secondary repository, retrieving the plurality of identifiers of the artifacts and assigning a rank higher than a rank of the corresponding artifact including a lower version number;
    based upon one or more relevancy parameters, determining a relation between the retrieved identifiers, to rank the retrieved identifiers and render the ranked identifiers as a categorized table on the secondary repository; and
    based upon a user action received on the ranked identifiers, determining the artifacts and the associated metadata present in the primary repository and downloading the determined artifacts and the associated metadata from the primary repository to the secondary repository, to synchronize the secondary repository with the primary repository.

2. The computer implemented method of claim 1, wherein indexing the content of the artifacts present in the primary repository and the artifacts present in the secondary repository comprises:
    rendering a search service to continually crawl the primary repository and the secondary repository;
    extracting one or more searchable content from the artifacts present in the primary repository and the artifacts present in the secondary repository;
    creating a data structure to organize and store the searchable contents of the artifacts and enable an indexer to index the contents of the artifacts.

3. The computer implemented method of claim 1, wherein indexing the content of the artifacts comprises:
    scheduling an index run to monitor the primary repository and the secondary repository; and
    based upon a modification in the primary repository and the secondary repository, indexing the content of one or more modified artifacts or one or more new artifact, wherein the modification includes editing the artifacts or including one or more new artifacts.

4. The computer implemented method of claim 1, wherein the integrated search service provided on the secondary repository is configured to:
    simultaneously query the primary repository, the secondary repository and a version manager, and
    retrieve the artifacts and the associated metadata from primary repository, the secondary repository and the version manager,
    wherein the version manager comprises information of one or more versions of the artifacts present in the primary repository and the secondary repository.

5. The computer implemented method of claim 1, wherein the categorized table includes
    a first column to render the identifiers of the artifacts present in the primary repository, and
    a second column to render the identifiers of the artifacts present in the secondary repository.

6. The computer implemented method of claim 5, wherein the user action is received on the first column of the categorized table.

7. The computer implemented method of claim 1, wherein the identifiers of the artifacts present in the secondary repository are rendered by:
    creating one or more rows for the retrieved identifiers of the artifacts;
    populating one or more fields of the rows using the associated metadata of the retrieved identifiers; and
    ranking the identifiers based upon the relevancy parameters, wherein the relevancy parameters include a hit-score parameter.

8. The computer implemented method of claim 1, wherein the relevancy parameters are selected from a group consisting: a hit-score, a version number, a latest version number, a maximum possible quality rating, a weight for a version number, a weight for version label, a weight for proximity based upon a security principle, a weight for quality rating, a weight for hit-score, and one or more artifact containers containing the retrieved artifacts.

9. The computer implemented method of claim 1, wherein ranking the retrieved identifiers in the first column of the categorized table comprises sorting the retrieved identifiers in the first column based upon the fifth computed score associated with the relevancy parameters for each artifact associated with the identifier retrieved from the primary repository.

10. The computer implemented method of claim 1 further comprising:

based upon the relevancy parameters, computing a minimum allowable score for the identifiers in the first column of the categorized table, wherein the minimum allowable score determines the identifiers whose artifacts have to be downloaded from the primary repository;

computing an allowable score for each artifact in the first column of the categorized table;

determining one or more identifiers present in the first column of the categorized table with a computed score greater than the minimum allowable score and storing the determined identifiers in a job object;

determining one or more administrative rights for the artifacts corresponding to the determined identifiers;

executing a scheduled job run for the job object by signing in to the primary repository and determining the artifacts associated with the determined identifiers;

downloading the determined artifacts corresponding to the job object to create an archive file; and uploading the archive file to the secondary repository and where the archive file is deployed, to synchronize the secondary repository with the primary repository.

11. A computer system to synchronize a primary repository and a secondary repository of data, comprising:
a processor configured to read and execute instructions stored in one or more memory elements; and
the one or more memory elements storing instructions to:
the processor to index content of one or more artifacts present in the primary repository and the secondary repository;
a user interface associated with the secondary repository to receive a search criteria;
an integrated service tool to
perform a combinatorial query, simultaneously on the indexed content of the primary repository and the secondary repository, and
retrieve a plurality of identifiers of the one or more artifacts and associated metadata satisfying a co-occurrence of a plurality of conditions in the search criteria by:
determining a version number parameter for each identifier of the artifact present in the primary repository;
determining a version number parameter for each identifier of the artifact present in the secondary repository;
for each artifact of the primary repository including a version number greater than a version number of a corresponding artifact of the secondary repository, retrieving the plurality of identifiers of the artifacts and assigning a rank higher than a rank of the corresponding artifact including a lower version number;
an integrated server in communication with the integrated service tool to
rank the retrieved identifiers based upon one or more relevancy parameters and a relation between the retrieved identifiers, and
render the ranked identifiers as a categorized table on the secondary repository; and
a secondary repository server to
determine the artifacts and the associated metadata present in the primary repository based upon a user action received on the ranked identifiers, and
download the determined artifacts and the associated metadata from the primary repository to the secondary repository, to synchronize the secondary repository with the primary repository.

12. An article of manufacture including a computer readable storage medium to tangibly store instructions, which when executed by a computer, cause the computer to:
indexing content of one or more artifacts present in the primary repository and one or more artifacts present in the secondary repository;
based upon a search criteria received at the secondary repository, invoking an integrated search service associated with the secondary repository to:
perform a combinatorial query, simultaneously on the indexed content of the primary repository and the indexed content the secondary repository, and
retrieve a plurality of identifiers of the one or more artifacts and associated metadata satisfying a co-occurrence of a plurality of conditions in the search criteria by:
determining a version number parameter for each identifier of the artifact present in the primary repository;
determining a version number parameter for each identifier of the artifact present in the secondary repository;
for each artifact of the primary repository including a version number greater than a version number of a corresponding artifact of the secondary repository, retrieving the plurality of identifiers of the artifacts and assigning a rank higher than a rank of the corresponding artifact including a lower version number;
based upon one or more relevancy parameters, determining a relation between the retrieved identifiers, to rank the retrieved identifiers and render the ranked identifiers as a categorized table on the secondary repository; and
based upon a user action received on the ranked identifiers, determining the artifacts and the associated metadata present in the primary repository and downloading the determined artifacts and the associated metadata from the primary repository to the secondary repository, to synchronize the secondary repository with the primary repository.

13. The article of manufacture of claim 12, wherein the relevancy parameters are selected from a group consisting: a hit-score, a version number, a latest version number, a maximum possible quality rating, a weight for a version number, a weight for version label, a weight for proximity based upon a security principle, a weight for quality rating, a weight for hit-score, and one or more artifact containers containing the retrieved artifacts.

14. The article of manufacture of claim 13, wherein a first computed score associated with the relevancy parameters is calculated by
computing a product of a hit-score and a weight for the hit-score for each artifact associated with the identifier retrieved from the primary repository.

15. The article of manufacture of claim 13, wherein a second computed score associated with the relevancy parameters is calculated by
computing a ratio of the version number and the latest version number of each artifact associated with the identifier retrieved from the primary repository;
computing a product of the ratio and the weight for the version number; and
computing a sum of the product and the first computed score.

16. The article of manufacture of claim 13, wherein a third computed score associated with the relevancy parameters is calculated by
    determining if each artifact associated with the identifier retrieved from the primary repository is labeled; and
    computing a sum of the weight for the labeled artifact and the second computed score.

17. The article of manufacture of claim 13, wherein a fourth computed score associated with the relevancy parameters is calculated by
    computing a ratio of the quality rating and the maximum possible quality rating for each artifact associated with the identifier retrieved from the primary repository;
    computing a product of the ratio and the weight for the quality rating for each artifact; and
    computing a sum of the product and the third computed score.

18. The article of manufacture of claim 13, wherein a fifth computed score associated with the relevancy parameters is calculated by
    computing a sum of the weight for proximity based upon one or more administrative rights for each artifact associated with the identifier retrieved from the primary repository and the fourth computed score.

19. The article of manufacture of claim 13, wherein the weight for proximity is calculated based upon a user's access to each artifact associated with the identifier retrieved from the primary repository.

20. The article of manufacture of claim 19, wherein the weight for the proximity for a user with a direct access to the artifact is computed as a maximum weight for the proximity.

21. The article of manufacture of claim 19, wherein the weight for the proximity for a user with an indirect access to the artifact is computed as an intermediate weight for the proximity.

22. The article of manufacture of claim 19, wherein the weight for the proximity for a user with an access to the artifact existing in a hierarchy is computed as a product of the maximum weight of the proximity and a numeric value assigned to the access based upon a number of levels in the hierarchy.

* * * * *